Oct. 16, 1951    A. FONTECCHIO    2,571,853
INDICATOR SUPPORT
Filed Aug. 24, 1946
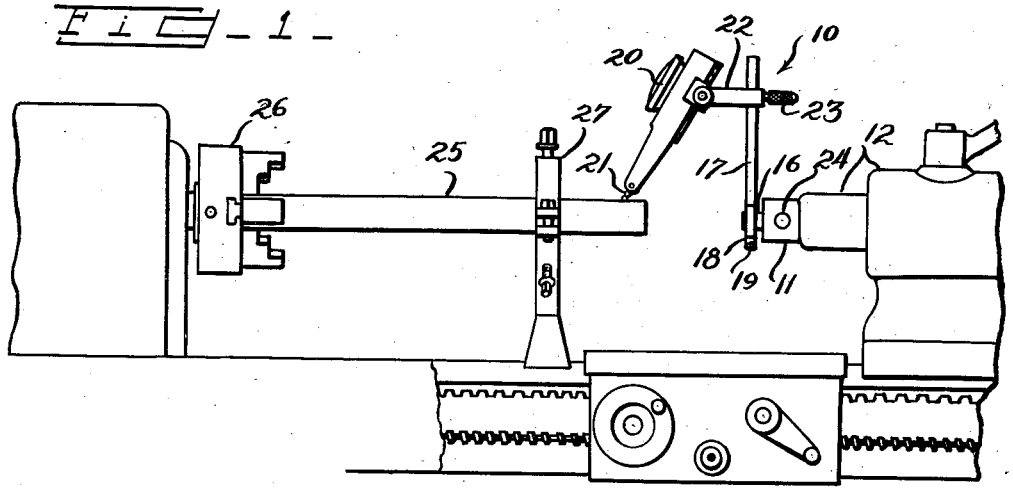
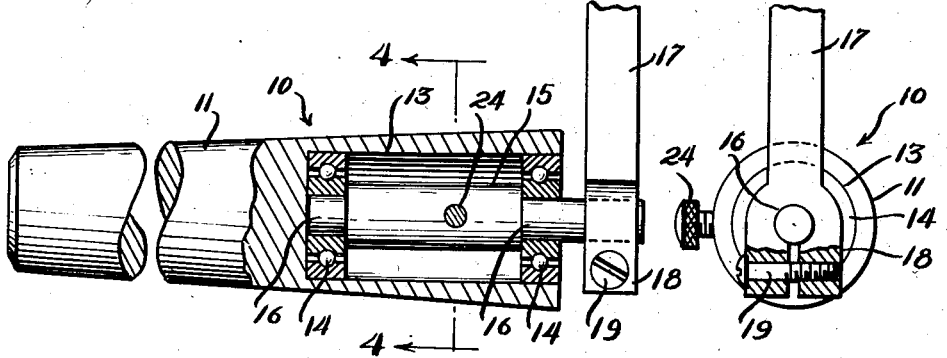
Inventor
Anthony Fontecchio
By Clarence A. O'Brien
and Harvey B. Jacobson
Attorneys Patented Oct. 16, 1951

2,571,853

UNITED STATES PATENT OFFICE 2,571,853

INDICATOR SUPPORT

Anthony Fontecchio, Iron Mountain, Mich., assignor of fifty per cent to Rudolph Manci, Iron Mountain, Mich.

Application August 24, 1946, Serial No. 692,850

3 Claims. (Cl. 248—124)

This invention relates to new and useful improvements in indicator supports, and the principal object of the invention is to provide a device employed with dial indicators, for the purpose of centering the work in lathes, grinders, screw machines, and the like.

A further object of the invention is to provide an indicator support which may be readily attached to or detached from the tool or machine with which it is used.

Another object of the invention is to provide an indicator support which, by virtue of its operation, will substantially reduce the amount of time required for setting up of the work in the machine.

An additional object of the invention is to provide an indicator support which is simple in construction and operation, and which will not easily become damaged.

A still further object of the invention is to provide an indicator support which will readily lend itself to economical manufacture.

With the above more important objects in view, and such other objects as may become apparent as this specification proceeds, the invention consists essentially of the arrangement and construction of parts as illustrated in the accompanying drawings, in which:

Figure 1 is a fragmentary side elevation of a lathe, showing the device thereon.

Figure 2 is a side elevation, partially broken away, of the device.

Figure 3 is an end view of the device, and

Figure 4 is a cross sectional view, taken substantially in the plane of the line 4—4 in Figure 2.

Referring now to the accompanying drawings in detail, the invention consists of an indicator support 10, the same embodying in its construction a tapered shank 11, such as may be conveniently clamped in the tail stock 12 of a lathe, or the like.

The shank 11 is formed in the major end thereof with a blind concentric bore 13, this being to receive a pair of spaced anti-friction bearings 14. A shaft 15, provided with down-turned end portions 16, is mounted in the bearings 14, one of the portions 16 projecting outwardly from the shank 11 as is best shown in Figure 2.

An arm 17 is equipped at one end thereof with a split clamp or socket 18, whereby it may be secured to the projecting portion of the shank member 16 by means of a suitable clamping screw 19.

The dial indicator 20, provided with the feeler 21 and with a mounting stem 22 is, in turn, supported by the arm 17 on which it is adjustably held by a further clamping screw 23. It should be understood that the indicator dial, together with its associated parts constitutes no part of the present invention and is illustrated in the drawing for reference purposes only.

The afore-mentioned shank 11 is provided in the lateral wall thereof with an additional clamping screw 24, the latter being engageable with the shaft 15, as is best shown in Figure 4.

When the device is placed in use, the work 25 is held in the head stock 26 of the lathe in the conventional manner and if desired, the outer end of the work may be supported in a suitable steady rest 27. The indicator with its associated support is mounted in the tail stock 12 as aforesaid, and the concentricity of the work 25 may be readily determined by simply rotating the indicator, together with the arm 17 and the shaft 15, in the shank 11, thus eliminating the previously experienced necessity of rotating the work itself, before the dial reading could be taken.

It will be noted that the invention when employed in association with the indicator dial, may be effectively used to determine both the concentricity and eccentricity of the work, as well as the parallel or non-parallel relationship thereof with respect to the machine bed. In the event of eccentricity or non-parallelism, the invention will also indicate the direction and amount of adjustment necessary for proper alignment. Where repair work is being undertaken and the center with which the work was originally provided has become damaged in service, proper readings may nevertheless be obtained, since they are taken from the lateral surface of the work, rather than from its end. After proper alignment has been made, it is then a simple matter to recut the center, in order that the work may be effectively supported during the machining operation.

The locking screw 24 may, of course, be employed for clamping the shaft 15, and thereby retaining the arm 17 together with the associated gauge 20, in any desired position.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. An indicator support comprising, a tapered shank provided in the major end thereof with a concentric bore, a pair of spaced anti-friction bearings positioned in said bore, a shaft mounted in said bearings and projecting at one end thereof from said bore, a locking screw provided in said shank and engageable with said shaft, and an arm secured at one end thereof to the projecting end portion of said shaft, an enlargement on said shaft positioned between said bearings for restricting the axial travel of said shaft.

2. An indicator support comprising a tapered shank, a bore in said shank having a shaft journaled therein and having a portion extending therefrom, means for limiting the axial movement of said shaft, means for locking said shaft in selected positions of rotation, an arm, means for detachably securing said arm to said extending portion of said shaft, anti-friction bearings secured in said bore supporting said shaft, said axial travel limiting means comprising spaced shoulders on said shaft engaging said bearings.

3. An indicator support comprising a tapered shank, a bore in said shank having a shaft journaled therein and having a portion extending therefrom, means for limiting the axial movement of said shaft, means for locking said shaft in selected positions of rotation, an arm, means for detachably securing said arm to said extending portion of said shaft, anti-friction bearings secured in said bore supporting said shaft, said axial travel limiting means comprising shoulders on said shaft engaging said bearings, and said locking means including a threaded aperture in said shank having friction locking means therein engaging said shaft.

ANTHONY FONTECCHIO.

REFERENCES CITED

The following references are of record in the file of this patent:

UNITED STATES PATENTS

| Number | Name | Date |
|---|---|---|
| 1,059,948 | Nerberle | Apr. 22, 1913 |
| 1,444,080 | Nyman | Feb. 6, 1923 |
| 2,124,164 | Fritzsch | July 19, 1938 |
| 2,371,451 | Larson | Mar. 13, 1945 |
| 2,476,239 | Duncan | July 12, 1949 |